United States Patent [19]

Holder et al.

[11] 4,007,161

[45] Feb. 8, 1977

[54] POLYMERS CONTAINING CARBON ATOMS IN THE BACKBONE WITH PENDANT N-HYDROCARBYLCARBOXAMIDE GROUPS

[75] Inventors: Charles B. Holder, Wappingers Falls; Richard F. Love; Donald R. Lachowicz, both of Fishkill, all of N.Y.

[73] Assignee: Texaco Inc., New York, N.Y.

[22] Filed: Dec. 30, 1974

[21] Appl. No.: 537,160

Related U.S. Application Data

[62] Division of Ser. No. 475,531, June 3, 1974.

[52] U.S. Cl. .............................. 260/66; 260/878 R; 526/13
[51] Int. Cl.² .................... C08G 16/06; C08G 2/38
[58] Field of Search ................. 260/66, 878 R, 879; 526/13

[56] References Cited

UNITED STATES PATENTS

| | | | |
|---|---|---|---|
| 3,687,849 | 8/1972 | Abbott | 252/47.5 |
| 3,751,522 | 8/1973 | Lachowicz et al. | 260/877 |
| 3,862,105 | 1/1975 | Lachowicz et al. | 260/878 R |
| 3,879,304 | 4/1975 | Waldbillig | 252/51.5 A |
| 3,890,357 | 6/1975 | Rubin et al. | 260/404 |
| 3,892,712 | 7/1975 | Arrighetti et al. | 260/66 |

*Primary Examiner*—Lucille M. Phynes
*Attorney, Agent, or Firm*—T. H. Whaley; C. G. Ries; Carl G. Seutter

[57] ABSTRACT

Lube oil, characterized by improved properties, may be prepared containing polymers having pendant N-hydrocarbylcarboxamide groups - typically N-(N',N'-dihydrocarbylaminohydrocarbyl) carboxamide groups.

14 Claims, No Drawings

POLYMERS CONTAINING CARBON ATOMS IN THE BACKBONE WITH PENDANT N-HYDROCARBYLCARBOXAMIDE GROUPS

This is a division, of application Ser. No. 475,531 filed June 3, 1974.

FIELD OF THE INVENTION

This invention relates to oil-containing compositions. More particularly it relates to lubricating oils, characterized by improved dispersancy and viscosity index, containing polymeric compositions.

BACKGROUND OF THE INVENTION

As is well known to those skilled in the art, oils such as lubricating oils including those derived from petroleum-based stocks or from synthetic compositions are desirably characterized by a variety of properties including dispersancy and viscosity index; and this field is characterized by continuing attempts to improve these properties.

It is an object of this invention to provide a novel oil composition. It is another object of this invention to provide lubricating oil compositions characterized by improved properties. Other objects will be apparent to those skilled in the art.

STATEMENT OF THE INVENTION

In accordance with certain of its aspects, the composition of this invention may contain an oil and admixed therewith a dispersing amount of a polymer containing carbon atoms in the backbone and pendant on at least some of said carbon atoms an N-hydrocarbylcarboxamide group.

DESCRIPTION OF THE INVENTION

In accordance with certain of its aspect, the lubricating oils which may be improved by this invention may include various lubricating oils such as naturally-occurring or synthetically prepared lubricating oils.

Natural oils may include mineral oils such as those obtained from petroleum, including distillate and residual lubricating oils. Typical of these may be:

1. An SAE 10 Mid-continent, solvent refined lubricating oil with the following flow properties:
   Viscosity at 210° F. SUS 44
   Viscosity at 100° F SUS 168
   Viscosity Index 91
2. An SAE 30 Pennsylvania type lubricating oil with the following flow properties:
   Viscosity at 210° F SUS 65
   Viscosity at 100° F SUS 500
   Viscosity Index 103
3. An SAE 30 Naphthenic solvent-refined lubricating oil with the following properties:
   Viscosity at 210° F SUS 58
   Viscosity at 100° F SUS 510
   Viscosity Index 62

Other such oils useful in the practice of this invention are well-known to those skilled in the art.

The synthetic lubricating oils which may be improved by use of this invention may include liquid, high molecular weight esters, fluorocarbons, polyethers, polysilicones, etc.

Typically, the synthetic oil may be an ester formed by the reaction of (a) a $C_3$–$C_{30}$ aliphatic acid $R^2(COOH)_n$ wherein $R^2$ is an aliphatic hydrocarbon (including inertly-substituted hydrocarbon) residue and $n$ is typically 1–3, preferably 1, with (b) a $C_4$–$C_{20}$ aliphatic alcohol $R^3(OH)_m$ wherein $R^3$ is an aliphatic hydrocarbon (including inertly-substituted hydrocarbon) residue and $m$ is an integer, preferably 1–6, more preferably 1–4, most preferably 3–4.

The base oil may, in one embodiment, be a liquid ester product of an aliphatic monocarboxylic acid and a polyol. The preferred of these acids may be $C_5$–$C_{36}$. Illustrative of such acids may be:

valeric $C_5$
pivalic $C_5$
dodecanoic $C_{12}$
stearic $C_{18}$
eicosanoic $C_{20}$
triacontanoic $C_{30}$
hexatriacontanoic $C_{36}$ Preferably $C_6$–$C_{10}$ acids may be used. Typical of such acids may be:

caproic acid $C_6$
caprylic acid $C_8$
capric acid $C_{10}$
enanthic acid $C_7$
pelargonic acid $C_9$
2-ethylhexanoic acid $C_8$ The most preferable, however, are enanthic and pelargonic acids.

The polyols which may be reacted with the noted aliphatic monocarboxylic acids, to form esters, may include $R^3(OH)_m$ wherein $R^3$ is an aliphatic hydrocarbon moiety and $m$ is an integer preferably 2–6, more preferably 2–4. The preferred polyols may be the $C_2$–$C_{10}$, say $C_2$–$C_4$ polyols. Typical of such polyols may be:

neopentylglycol
trimethylol ethane
trimethylol propane
trimethylol butane
pentaerythritol
dipentaerythritol The preferred glycol may be pentaerythritol.

Typical esters of aliphatic monocarboxylic acids and polyols may be $$R^3(OCOR^2)_m$$

including the following illustrative examples:

pentaerythritol tetra-valerate
pentaerythritol tetra-caproate
pentaerythritol tetra-pelargonate
pentaerythritol tetra-butyrate
dipentaerythritol hexa-valerate
dipentaerythritol hexa-pelargonate
dipentaerythritol hexa-caprate
trimethylol propane tri-caproate
trimethylol propane tri-butyrate
trimethylol propane tri-valerate
trimethylol propane tri-pelargonate A preferred ester may be pentaerythritol tetra-caproate.

In another embodiment, the liquid synthetic ester may be the product of reaction of an aliphatic polycarboxylic acid and an aliphatic monohydroxy alcohol.

Preferably, the aliphatic polycarboxylic acid may have the formula $R^2(COOH)_n$ wherein $n$ is greater than 1 and preferably 2–3. Typical polycarboxylic acids may include:

adipic acid azelaic acid
sebacic acid
dodecanedioic acid
succinic acid
1,2,4 butane tricarboxylic acid Preferred acids may be adipic acid and azelaic acid.

Preferably the alcohol may have the formula $R^3OH$ where $R^3$ may be a saturated aliphatic group which may be inertly substituted. Typical alcohols may include methanol, n-butanol, 2-ethyl-n-butanol, pentanol, 1-hexanol, 2-ethylhexanol, 1-decanol, 2-ethyl-octanol, and 2-ethoxy ethanol.

Specific illustrations of this type of synthetic ester lubricating oils which may be used in this invention are:
di-2-ethylhexyl sebacate
di-2-ethylhexyl azelate
di-2-ethylhexyl adipate
di-n-amyl sebacate
di-2-ethyl octyl succinate
di-2-ethoxyethyl sebacate
di-2-ethyl octyl adipate
di-2-ethyl octyl azelate
tri-pentyl-1,2,4 butane carboxylate Preferred esters may be di-2-ethylhexyl azelate and di-2-ethylhexyl adipate.

These oils may be blended with other synthetic esters as noted supra or with other oils, such as castor oil; lard oil; polymerized olefins; copolymers of alkylene glycols or aliphatic alcohols with organic acids, etc.

The lubricant compositions of the present invention may contain other additives, typically present in amount of 0.001–10 wt. %, including:
a. oxidation inhibitors such as aromatic amines, e.g., phenothiazine;
b. metal corrosion inhibitors such as benzotriazole;
c. metal passivating and load-carrying agents, such as tricresyl phosphate;
d. anti-foamants such as a silicone; etc.

Although the preferred compositions of this invention may be lubricating oils characterized by improved dispersancy and/or by improved viscosity index, it is a feature of this invention that the additives disclosed herein may permit attainment of other improvements in crude oils, in residual oils, in reduced crudes, in fuel oils, in distillates, in wax-containing compositions, etc.

In practice of this invention, the preferred composition may contain a dispersing amount of the novel polymer. Typically this dispersing amount may be 0.1–10 parts, preferably 1–4, say 2 parts of polymer per 100 parts of oil. In the case of lubricating oils, the novel polymer product may commonly impart improved viscosity index; and the viscosity index improving amount may be 0.1–10, preferably 0.5–3, say 1.6 parts of polymer per 100 parts of oil. They may be used alone or in combination with other dispersing agents or viscosity index improving agents.

The novel additives of this invention may be polymers containing carbon atoms in the backbone and pendant on at least some of said carbon atoms, an N-hydrocarbylcarboxamide group, preferably an N-(N',N'-dihydrocarbylaminohydrocarbyl) carboxamide group, such as an N-(N',N'-dialkylaminoalkyl) carboxamide group.

The polymers of this invention, containing carbon atoms in the backbone chain, and in the preferred embodiment having backbone chains consisting essentially of carbon atoms, may typically include those derived by polymerization of lower olefins such as ethylene, propylene, butylenes, etc.; butadiene; styrene, etc.; the preferred may be copolymers of ethylene as with propylene. The most preferred polymers may have a backbone structure derived from terpolymers of ethylene, propylene, and third monomer such as ethylidene norbornene or 1,4-hexadiene. A preferred polymer is that having a backbone chain derived from ethylene, propylene, and 1,4-hexadiene.

Other typical preferred polymers may contain a backbone chain (R) derived from the following polymers noted in the following Table:

TABLE (a) EPT terpolymer prepared from ethylene, propylene, and 1,4-hexadiene and having a molecular weight $\overline{M}_n$ of 300–100,000, preferably 20,000–70,000, say 68,000 as typified by the commercially available product marketed by DuPont under the trademark Nordel 1320;

(b) 1,2-polybutadiene (prepared by polymerizing butadiene-1,3 in the presence of 15 wt % butyl lithium in hexane or tetrahydrofuran at 0°–60° C) having a molecular weight $\overline{M}_n$ of 3,000–20,000;

(c) polypropylene having a molecular weight $\overline{M}_n$ of 500–3500, typically 500–2600, say 650–995;

(d) polybutylene having a molecular weight $\overline{M}_n$ of 300–1900, typically 1100;

(e) a copolymer of ethylene and butylene having a molecular weight $\overline{M}_n$ of 810;

(f) an EPT terpolymer having a molecular weight $\overline{M}_n$ of 3000–30,000, typically 3970–6950, prepared by copolymerizing ethylene, propylene, and 1,4-hexadiene at 0°–20° C in the presence of tri-n-butyl vanadate catalyst and diethyl aluminum chloride cocatalyst in n-heptane solvent in the presence of hydrogen. A typical such polymer contains 32 mole % propylene, 2.8 mole % 1,4-hexadiene, and 65.2 mole % ethylene, and has one double bond for each 1000–2000, say 1160–1880 molecular weight units.

The additive used in practice of the process of this invention may have the following formula:

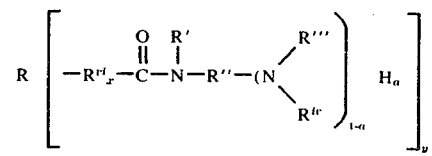

wherein R is a carbon-containing polymer residue, R', R''', and $R^{iv}$ are hydrogen or saturated hydrocarbon, R'' and $R^{vi}$ are divalent saturated hydrocarbon, $a$ is 0 or 1, $x$ is 0 or 1, and $y$ is 1 – 100 preferably 2 – 20, say 10.

R is a carbon-containing polymer residue, typically derived from those set forth in the above table and having a molecular weight $\overline{M}_n$ of 300–100,000, preferably 300–20,000, say about 3000. The additive polymer, used in the practice of the invention, may have a molecular weight of the same order of magnitude, i.e., $\overline{M}_n$ of 300–100,000, preferably 300–20,000, say about 3000.

R', R''', and $R^{iv}$ may be hydrogen or a saturated hydrocarbon radical selected from the group consisting of alkyl, aralkyl, cycloalkyl, aryl, and alkaryl including such radicals when inertly substituted. A saturated hydrocarbon radical is one which is substantially, and preferably entirely free of olefinic or acetylenic unsaturation, although as is apparent, a saturated hydrocarbon radical, as the term is used herein may contain aromatic unsaturation as in a phenyl group (or in the case of R'' or R$^{vi}$ infra a phenylene group). When R' or R''' or R$^{iv}$ is alkyl, it may typically be methyl, ethyl, n-propyl, iso-propyl, n-butyl, i-butyl, sec-butyl, amyl, octyl, decyl, octadecyl, etc. When R' or R''' or R$^{iv}$ is aralkyl, it may typically be benzyl, beta-phenylethyl, etc. When R' or R''' or R$^{iv}$ is cycloalkyl, it may typically be cyclohexyl, cycloheptyl, 2-methylcycloheptyl, 3-butylcyclohexyl, 3-methylcyclohexyl, etc. When R' or R''' or R$^{iv}$ is alkaryl, it may typically be tolyl, xylyl, etc. R' or R''' or R$^{iv}$ may be inertly substituted, i.e., it may bear a non-reactive substituent such as alkyl, aryl, cycloalkyl, ether, halogen, etc. Typically inertly substituted groups may include 3-chloropropyl, 2-ethoxyethyl, carboethoxymethyl, 4-methylcyclohexyl, p-chlorophenyl, p-chlorobenzyl, 3-chloro-5-methylphenyl, etc. The preferred groups may be lower alkyl, e.g., $C_1$–$C_{10}$ alkyl, groups including eg methyl, ethyl, n-propyl, i-propyl, butyls, amyls, hexyls, octyls, decyls, etc. R''' and R$^{iv}$ may preferably be methyl; and R' may preferably be hydrogen. When at least one of R''' or R$^{iv}$ is hydrogen, the polymer product may be crosslinked; it is generally preferred that neither R''' or R$^{iv}$ is hydrogen. Preferably at least one of R''' or R$^{iv}$ is other than hydrogen. It should be noted that R', R''', and R$^{iv}$ are characterized as "saturated hydrocarbon" including e.g., alkyl, aryl etc.; and this characterization implies absence of olefinic double (and acetylenic triple) bonds.

R'' may be a divalent saturated hydrocarbon selected from the same group as that from which R' or R''' or R$^{iv}$ is selected — subject to the qualification that it bear an additional valence bond, i.e., that it contain one less hydrogen. Typically R'' may be methylene —$CH_2$—, ethylene —$CH_2CH_2$, propylene —$CH_2CH_2CH_2$—, phenylene —$C_6H_4$—, etc. R$^{vi}$ may be a divalent saturated hydrocarbon defined as in the case of R''. R'' and R$^{vi}$ may be the same or different.

In the above formula, $a$ and $x$ may be 0 or 1. When $a$ is 1, the formula may be:

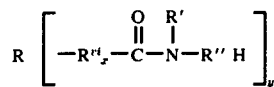

and typically

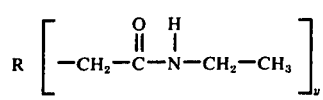

or

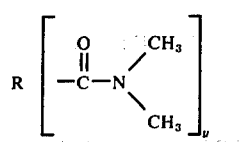

When $a$ is 0, the formula may be:

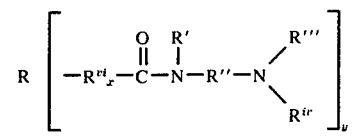

and typical products may include:

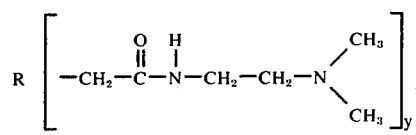

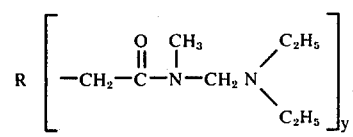

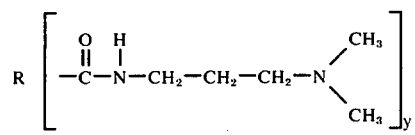

When $x$ in the formula is 0, the formula may be

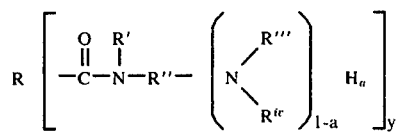

and typically

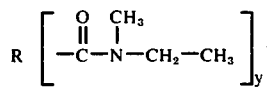

or

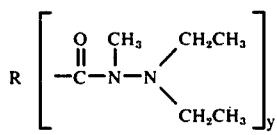

When $x$ in the formula is 1, the formula may be

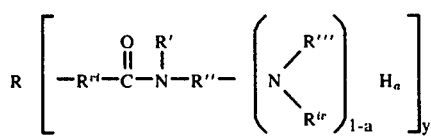

and typically

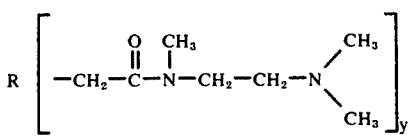  or

-continued

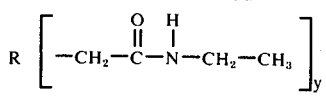

The polymer compositions useful in practice of the process of this invention may contain a wide range of pendant N-hydrocarbylcarboxamide groups in the molecule.

Where it is desired to utilize the product in an oil system, the number of pendant groups may typically be one for each 300–10,000 molecular weight units, preferably one for each 1000–5000 molecular weight units, say one for each 1800 molecular weight units. The greatest solubility in lube oil systems may be achieved when the polymer base R has a molecular weight $\overline{M}_n$ of 300–15,000.

The preferred polymer composition used in practice of this invention may be derived from polymers of ethylene-propylene-third monomer-most preferably from a terpolymer of ethylene-propylene-1,4-hexadiene which, when used in this invention may have the following repeating groups in the polymer chain:

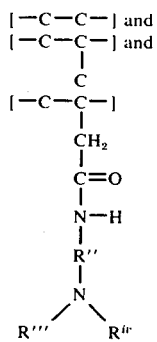

Such a polymer may typically contain 40 – 80 mole % derived from ethylene, 20 – 60 mole % derived from propylene, and 0.1 – 5 mole % derived from third monomer.

Specific illustrative polymers may include those containing the following repeating groups

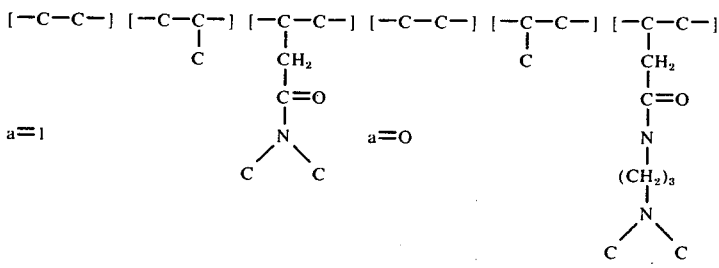

Typical other specific polymer products which may be employed in practice of the process of this invention are those set forth in the following table.

TABLE a. EPT containing 65.2 mole % derived from ethylene, 32 mole % derived from propylene, and 2.8 mole % derived from 1,4-hexadiene, of molecular weight $\overline{M}_n$ of about 4800 and containing, per 1380 molecular weight units, one pendant group having the formula

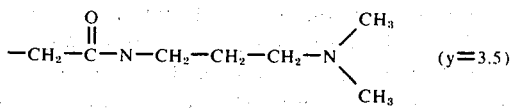

b. EPT containing 65.2 mole % derived from ethylene, 32 mole % derived from propylene, and 2.8 mole % derived from 1,4-hexadiene, of molecular weight $\overline{M}_n$ of about 4800 and containing, per 1380 molecular weight units, one pendant group having the formula

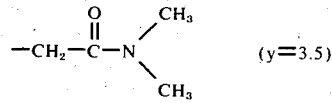

c. EPT containing 57 mole % derived from ethylene, 41 mole % derived from propylene, and 2 mole % derived from 1,4-hexadiene, of molecular weight $\overline{M}_n$ of about 4800 and containing per 1800 molecular weight units, one pendant group having the formula:

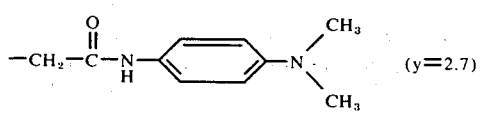

d. EPT containing 57 mole % derived from ethylene, 41 mole % derived from propylene, and 2 mole % derived from 1,4-hexadiene, of molecular weight $\overline{M}_n$ of about 4800 and containing per 1800 molecular weight units, one pendant group having the formula:

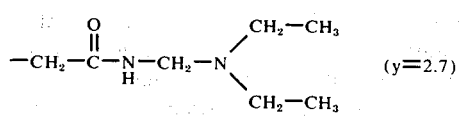

e. EPT containing 59.3 mole % derived from ethylene, 38.5 mole % derived from propylene, and 2.2 mole % derived from 1,4-hexadiene, of molecular weight $\overline{M}_n$ of about 6700 and containing per 1700 molecular weight units, one pendant group having the formula:

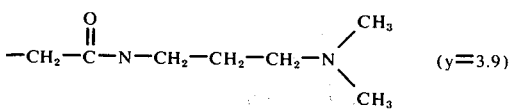

f. EPT containing 60.9 mole % derived from ethylene, 38 mole % derived from propylene, and 1.1 mole % derived from 1,4-hexadiene, of molecular weight $\overline{M}_n$ of about 31,000 and containing per 3200 molecular weight units, one pendant group having the formula:

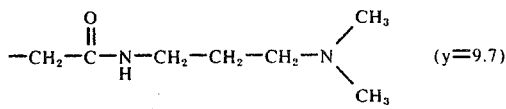

g. 1,2 polybutadiene ($\overline{M}_n$ of about 6150) containing, per 675 molecular weight units (8% nitroketonized, i.e., 8% of the unsaturated positions in the polymers have been converted to vicinal nitroketo groups), one pendant group having the formula:

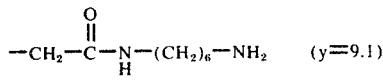

These novel products may find particular use as additives to lubricating oils, petroleum base or synthetic (e.g., ester type such as polyester oils); it may be found that by presence of these novel compounds, the dispersancy of such oils may be substantially improved especially when $a$ is 0.

Commonly these products may be useful in the form of concentrates containing 10–70 parts, preferably 20–60 parts, say 50 parts of polymer per 30–90 parts, preferably 20–80 parts, say 50 parts of inert diluent-solvent. Inert diluent-solvents may include hydrocarbons such as toluene, and more preferably oils including lubricating oils — synthetic or petroleum based. A typical concentrate may include 35 parts of dimethylaminopropylamino derivative of the nitroketonized polymer ($\overline{M}_n$ of 6700) prepared from ethylene-propylene-1,4-hexadiene in 65 parts of 100 E Pale Stock HF (a paraffinic distillate oil 39 SUS viscosity at 210° F) lubricating oil.

The dispersancy of a lubricating oil may be determined by a standard Bench Sludge Test. In this test, the oil to be tested (containing 1.5–3% of additive or none in control examples) is introduced into a test bottle together with a suspension of 6 wt % of titanium dioxide in oil. The mixture is heated at elevated temperature for an extended period of time with agitation; a measured sample is then centrifuged and the depth of the sediment is recorded in millimeters. The scale may cover a range of 0–100; and commonly these readings may be less than 10. A reading of 0.8 or less is considered sufficiently good on this BSI test so that the sample may be subjected to the more severe BSII test.

In the BSII test, an aliquot sample is mixed with a standard hydrocarbon engine blowby — and thus this test is more correlative with actual conditions of use than is the BSI test. A BSII rating of less than about 1.8 is generally considered to be a significant indication of high dispersancy of the additive.

Use of the additive of this invention may lower the BSI reading of a typical oil by eg 1.3 units; and the BSII reading may be lowered typically by eg 2.1 units.

Viscosity index of lubricating oils may be measured in standard manner; and improvement in viscosity index of 30–50 units may be common.

The novel polymers of this invention may be prepared by the reaction of an alpha-nitroketone polymer

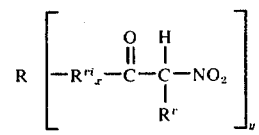

with an amine

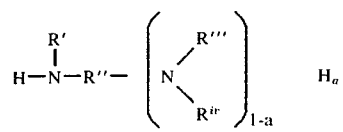

wherein R is a carbon-containing polymer residue, R', R''', and $R^{iv}$ are hydrogen or saturated hydrocarbon, $R^v$ is saturated hydrocarbon, R'' and $R^{vi}$ are divalent saturated hydrocarbon, $a$ is 0 or 1, $y$ is 1–100, and $x$ is 0 or 1, thereby forming product amide polymer.

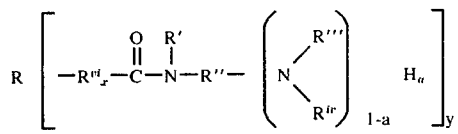

The charge alpha-nitroketone polymers which may be employed in practice of the process of this invention may be compounds characterized by a carbon-containing backbone bearing pendant groups containing a keto-group and an alpha-nitro group. Typical of the polymers, which when nitro-ketonized are useable in the instant process, may be polymers, (containing residual unsaturation, including residual terminal unsaturation) wherein R is a polymer moiety containing a carbon-to-carbon backbone, possessing residual unsaturation, typified by ethylene-propylene-third monomer. Typical of these base polymer molecules which, when nitroketonized, may be used as charge materials to the process of this invention may be the following:

a. EPT terpolymer prepared from ethylene, propylene, and 1,4-hexadiene and having a molecular weight $\overline{M}_n$ of 300–100,000, preferably 20,000–70,000, say 68,000 as typified by the commercially available product marketed by DuPont under the trademark Nordel 1320;

b. 1,2-polybutadiene, prepared by polymerizing butadiene-1,3 in the presence of 15 wt. % butyl lithium in hexane or tetrahydrofuran at 0°–60° C., having a molecular weight $\overline{M}_n$ of 3,000–20,000;

c. polypropylene having a molecular weight $\overline{M}_n$ of 500–3500, typically 500–2600, say 650–995;

d. polybutylene having a molecular weight $\overline{M}_n$ of 300–1900, typically 1100;

e. a copolymer of ethylene and butylene having a molecular weight $\overline{M}_n$ of 810;

f. an EPT terpolymer having a molecular weight $\overline{M}_n$ of 300–30,000, typically 3970–6950, prepared by copolymerizing ethylene, propylene, and 1,4-hexadiene at 0°–20° C, in the presence of tri-n-butyl vanadate catalyst and diethyl aluminum chloride cocatalyst in n-heptane solvent in the presence of hydrogen. A typical such polymer contains 32 mole % propylene, 2.8 mole % 1,4-hexadiene, and 65.2 mole % ethylene, and has one double bond for each 1000–2000, say 1160–1880 molecular weight units.

These polymers, which may be nitroketonized contain residual unsaturation (typically in amount equivalent to one double bond for each 300–10,000 molecular weight units) of the type RCH=CH$_2$ or RCH=CHR preferably mainly on side chains so that rupture of the polymer backbone chain does not occur on cleavage of the nitroketone to aminoamide. Nitroketonization of such polymers, as is well-known, occurs typically by reaction of the olefin (e.g., the double bonds of the polymer side chain) with N$_2$O$_4$ and oxygen to give nitro peroxynitrate which, upon reaction with, e.g., dimethylformamide, is converted to the corresponding nitroketone.

When the R moiety in the charge nitroketone is derived from a polymer, the polymer molecule may contain a wide range of nitroketone groups per molecule, depending upon the number of double bonds in the parent polymer and the degree of nitroketonization. Where the product to be prepared is to be oil soluble, as in the preferred embodiment, the number of nitroketone groups may preferably be one for each 300–10,000 molecular weight units, preferably one for each 1000–5000 molecular weight units, say one for each 1800 molecular weight units. Preferably in this instance, the greatest solubility in lube oil systems may be achieved when the molecular weight $\overline{M}_n$ is 300–15,000 (of the charge polymer).

The alpha-nitroketone polymer which may be reacted with an amine according to the process of this invention may have the formula

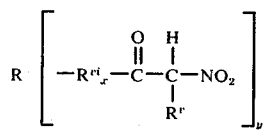

wherein R is a carbon-containing polymer residue, R$^v$ is a saturated hydrocarbon such as alkyl, preferably lower (e.g., C$_1$ to C$_{10}$) alkyl, R'' and R$^{vi}$ are divalent saturated hydrocarbon, typically of the form (CH$_2$)$_z$ wherein z is 1–10, and y is 1–100, preferably 2–20, say 10. x is 0 or 1.

The preferred polymer-derived R group may be that derived from the terpolymer of ethylene-propylene - 1,4-hexadiene, which when nitroketonized may contain the following repeating groups in the polymer chain:

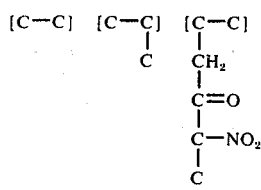

In the preferred practice of the process of this invention the preferred polymer-type charge nitroketone may be nitroketonized ethylene-propylene-1,4-hexadiene.

The charge amine which may be employed in practice of the process of this invention may correspond to the following formula

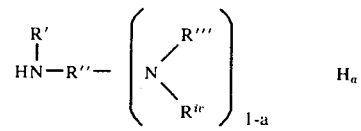

wherein R', R''' and R$^{iv}$ are hydrogen or saturated hydrocarbon, R'' is divalent saturated hydrocarbon, a is 0 or 1. Preferred amines include primary monoamines and secondary monoamines, or diamines containing either one tertiary amine group and one primary amine group or two primary amine groups.

In the preferred embodiment, the R'', R''', and R$^{iv}$ groups are derived from lower alkyl and contain 1–10, say 1–5 carbon atoms. Illustrative compounds may include the following:

TABLE dimethyl amine
diethyl amine
dipropyl amine
dibutyl amine
n-butyl amine
n-octyl amine
aniline
dimethyl aniline
di-cyclohexyl amine
di-phenyl amine
hexamethylene diamine
dimethylaminopropylamine
1,4-phenylene diamine
dimethylaminoethyl amine
diethylaminoethyl amine
diethylaminopropyl amine The preferred amines may include dimethylaminopropylamine and hexamethylene diamine.

In practice of the process of this invention, the nitroketonized polymer and the amine may be added to the reaction mixture in mole ratio (of amine to nitroketone) of 1–100:1, preferably 5–15:1, say about 12:1.

It is a feature of the process of this invention that it may, if desired, be carried out in the presence of 0–100, preferably 1–50, say 10 parts (per part of total reactants) of an inert diluent, in which the reactants are preferably soluble, typified by a hydrocarbon such as n-hexane, n-heptane, xylene, ethylbenzene, toluene, etc.; halogenated hydrocarbons typified by dichlorobenzene; tertiary alcohols including tertiary butyl alcohol; ethers typified by dioxane, tetrahydrofuran, etc.

In one embodiment of this invention, however, the reaction may be carried out in the presence of an excess of amine, preferably that being employed as reactant.

Preferably reaction may be carried out at temperature of 50°–200° C, typically 60°–130° C, say 80° C at a pressure of 0–200 psig typically 0–50 psig, say 0 psig for a period of time of 1–50 hours, preferably 3–30 hours, say 24 hours. It is a particular feature of the process of this invention that moderate temperature, e.g., 70°–100° C may be employed.

Although it may be possible to carry out the process of this invention in the presence of catalyst, it is a particularly desirable feature that the process proceeds readily in the absence of added catalyst. It appears that the reaction may be autocatalytically influenced by the amine reactant.

During the course of the reaction, the alpha-nitroketone and the amine react to form the product according to the following typical reaction.

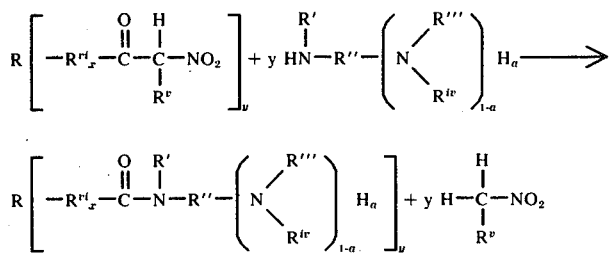

In a typical specific example, the reaction may be as follows where $y$ is 3.5, $R^{vi}$ is $CH_2$, $R'$ is $CH_3$, $R'''$ and $R^{iv}$ are $CH_3$, $R^v$ is $CH_3$, $x$ is 1, $a$ is 0, and $R''$ is $C_3H_6$:

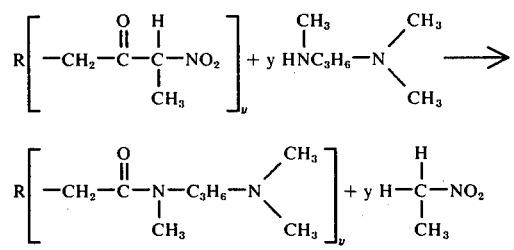

Typically the reaction may be carried out under reflux (at reflux temperature) in the presence of diluent-solvent, typically benzene, which may be distilled from the reaction mixture. Upon condensation of the distillate, it may be found that the distillate contains (per mole of charge nitroketone) 0.25–1 moles preferably 0.4–0.8 moles, say 0.75 moles of by-product nitro compound, e.g., nitromethane or nitroethane.

When the charge nitroketone includes a polymer-type moiety typified by the EPT polymer prepared from ethylenepropylene-1,4-hexadiene, the polymer product may be obtained by water washing to remove excess amine and then distilling off remaining diluent-solvent (typically benzene).

Preferably the reaction may be carried out under substantially anhydrous conditions, i.e., containing less than 1%, and more preferably less than 0.1% water.

Practice of the process of this invention may be apparent to those skilled in the art from inspection of the following examples wherein, as elsewhere in this specification, all parts are parts per weight unless otherwise stated. In the examples, as elsewhere, unfilled valence bonds may be filled with hydrogen atoms.

DESCRIPTION OF SPECIFIC EMBODIMENTS

EXAMPLE I a. Preparation of Charge Polymer

A 3-liter resin kettle equipped with mechanical stirrer, gas sparger, thermowell, serum cap inlet and gas inlet and outlet facilities was flamed and purged with prepurified nitrogen. The flask was cooled to room temperature; and 2000 ml. of purified n-heptane and 40 ml. of 1,4-hexadiene were added. After cooling to 10° C, there were added 88 ml. (110 millimoles) of a 20 wt. % solution of diethyl aluminum chloride in heptane and 17.6 ml. (9.6 millimoles) of a 0.547 mole per liter solution of tri-n-butyl vanadate in n-heptane. Propylene (4000 ml./min), ethylene (2000 ml./min.) and hydrogen (300 ml./min.) were then bubbled through for 1 hour, with the temperature ranging between 10° and 19° C. After inactivating the catalyst with 30 ml. of a mixture of benzene and methanol (1:1), the product solution was washed with diluted hydrochloric acid and then with water. The polymer was precipitated into a 75:25 mixture of methanol and isopropyl alcohol, washed with methanol and stripped in vacuo. Yield 174 g., molecular weight ($\overline{M}_n$) 6700 by vapor phase osmometry.

b. Nitroketonization of Charge Polymer

To a 3-liter resin kettle equipped with a mechanical stirrer, a thermowell, a gas inlet tube and a reflux condenser were charged 76.0 g. of polymer and 1920 ml. n-hexane. The contents were purged with oxygen while being cooled to 0° C. During approximately 5 hours, a mixture of $O_2$ and $N_2O_4$ was passed through the reaction mixture (held at 0° C), using the $O_2$ stream (about 83.6 ml./min.) to vaporize the $N_2O_4$ from a trap containing liquid $N_2O_4$. The color of unreacted $N_2O_4$ appeared in the vapor space in the kettle after some 3.1 ml. (0.05 mole) liquid $N_2O_4$ had been introduced, corresponding to one double bond for some 1500 molecular weight units, or an average of 4.5 double bonds per molecule. The resultant nitro peroxynitrate was cleaved to the alpha-nitroketone by dropwise addition of 240 ml. dried dimethylformamide (DMF), over a 10 minute period with the temperature held between 0° and 2° C. The lower layer (mainly DMF, some 12% hexane, by GC) was separated and the upper layer was treated with 50.4 g. $NaHCO_3$ to remove any acid. The product was divided into five equal parts for further use. One part was washed with water to remove DMF and one-fifth of the washed material was stripped in vacuo. The weight of residue (2.80 g.) indicated that a total of 70.0 g. of product was obtained. Nitrogen content of the product was determined as 0.88%, corresponding to one nitrogen atom for some 1590 molecular weight units and some 4.2 nitrogen atoms per molecular basis EPH molecular weight. The infrared spectrum showed both nitro and carbonyl absorption bands.

c. Preparation of Dimethylamino - propylamide of the Nitroketonized charge polymer NKEPH One portion of the NKEPH solution, containing about 14 g. (about 8.8 milliequivalent of nitrogen basis analysis) of NKEPH in 365 ml. solution was introduced into a 500 ml. three-neck round bottom flask and some 50 ml. hexane distilled over to remove most of the water present. There was then added 13 ml. (about 104 millimoles, mole ratio 12:1 amine: NKEPH), dried dimethylaminopropylamine and the mixture refluxed for 24 hours (pot temperature about 70° C). Qualitative infrared spectra indicated that essentially all the ketone carbonyl absorption had disappeared, together with about half the nitro absorption, and that absorption at about 6.0 microns appeared, presumably due to amide. After thorough extraction with water and isolation of the product, a yield of 12.84 g. was indicated, about 91% of the charge weight. Analysis of the product showed 1.1% nitrogen (total). If all aminoamide as intended, this would correspond to an equivalent weight of 2550, or 2.6 aminoamide units per molecule basis EPH molecular weight. Analysis of a 2 wt. % solution in oil gave 0.028% total nitrogen and 0.013% basic nitrogen, corresponding to equivalent weights of 2000 or 2150. Bench Sludge dispersancy and other evaluations of this product in 2% oil solution are presented in Table I.

EXAMPLE II

In this example, a cleavage aminoamide was prepared from a portion of the washed product from Example Ib, using 1,6-hexanediamine as the cleavage agent in 12:1 mole ratio to the NKEPH, and essentially the same conditions as in Example Ic. Bench Sludge dispersancy and other evaluations of this product are presented in Table I.

EXAMPLE III

A repeat run of Example II, but at 50% higher concentration in benzene-hexane (pot temperature 74° C) gave only about 40% of the product soluble in benzene after water extraction and drying the solvent by refluxing it through a Soxhlet extractor containing 4A Molecular Sieve. Results of evaluating the soluble portion are presented in Table I as Example III.

EXAMPLE IV

In this example the nitroketonized ethylene-propylene-hexadiene was prepared in manner similar to that of Example I. The NKEPH had a molecular weight $\overline{M}_n$ of about 8600, a nitrogen content of 0.76%, an equivalent weight (based on nitrogen) of 1840, and an average of 4.7 unsaturations per molecule. (The charge EPH had a molecular weight of about 4800, an equivalent weight (based on $N_2O_4$ uptake) of 1380, and an average of 3.5 unsaturations per molecule.

3 grams of the above polymer were charged to a 100 ml. flask together with 50 ml. benzene and 2.65 ml. (21.2 millimoles) of dimethylaminopropylamine.

After all materials were in solution, a small sample was removed, placed on a NaCl disc and kept in a vacuum oven overnight to remove volatiles, and the infrared spectrum of the residue was determined. After refluxing for 16 hours (approximately 80° C) the infrared spectrum of the product was again determined in the same way as before. Comparison of the infrared spectra indicated that essentially all of the carbonyl absorption at about 5.8 microns had disappeared, but only 30 to 40 percent of the nitro absorption at about 6.4 microns.

The product was washed with five successive portions of water, filtered, and stripped of solvent in vacuo. The residue amounted to 3.03 g. Analysis of the product indicated 1.7 percent total nitrogen. If all aminoamide, this would indicate 1650 equivalent weight per aminoamide function, or an average of 2.9 aminoamide units per molecule basis EPH molecular weight. Bench Sludge dispersancy evaluation results are given in Table I.

EXAMPLE V

In this example, the charge EPH was a polymer having a molecular weight $\overline{M}_n$ of 31,000, and containing 60.9 mole % ethylene, 38 mole % propylene and about 1.1 mole % 1,4-hexadiene. A cleavage nitroketone was prepared as in Example Ib except that the DMF was added more slowly. Based on the $N_2O_4$ absorption, the preferred EPH polymer contained one double bond per 2400 molecular weight units or 13 double bonds per molecule. Total nitrogen content of NKEPH was 0.55% corresponding to one nitro-function per 2540 molecular weight units.

After removing 10% of the product for analysis, the remainder (in dilute hexane solution) was converted to cleavage aminoamide by the same procedure as described in Example Ic. After removing a small amount of gel that was not soluble in hexane, the hexane solution contained 10.9 g. product (from 15 g. EPH original charge) basis evaporation of an aliquot (Total nitrogen analysis indicated 0.7% N, corresponding to 2 N atoms per 4000 molecular weight units). The infrared spectrum indicated both amide and nitro functions to be present. An oil blend was prepared by addition of SNO-7 to the hexane solution, stripping out the hexane in vacuo and adding more SNO-7 to give a 1.5 wt. % blend. Evaluation of this blend is presented in Table 1.

In the following Table, there are noted for each Example, the weight percent of the amide polymer in the SNO-7 standard oil, the other additives present if any, the BSI and BS II dispersancy, the kinematic viscosity at 100° F. and at 210° F, the viscosity index, and the pour point.

TABLE I

| Example | Wt. % Product | Other Additive | Dispersancy BSI | BS II | Kin. Vis. Cs 100° F | 210° F | VI | Pour Point° F |
|---|---|---|---|---|---|---|---|---|
| I | 2.0 | none | 1.2 | 0.8 | 52.4 | 7.99 | 132 | −5 |
|  | 0 | yes* | 0.1 | 2.1 |  |  |  |  |
|  | 0 | none | 2.5 | 2.9 |  |  |  |  |
| II | 2.0 | none | 1.5 | 0.9 | 50.4 | 8.06 | 142 |  |
| III | 0 | yes* | 0.2 | 1.3 |  |  |  |  |
|  | 0 | none | 2.1 | 2.9 | 25.6 | 4.52 | 97 |  |
|  | 2.0 | none | 1.2p | 1.4p | 58.1 | 9.82 | 167 | −5 |
| IV | 3.0 | none | 1.0 | 0.8 |  |  |  |  |
| V | 1.5 | none | 1.8 | 0.9 | 72.5 | 10.45 | 141 | 0 |

*Other additive is a commercially available ethoxylated olefin-$P_2S_5$ reaction product present in amount of 5 weight percent.
-n.b. the designation p in the dispersancy Tests indicates that two phases separated.

From the above Table it will be apparent to those skilled in the art that the novel technique of applicants' invention permits attainment of unexpected results. By way of illustration, the results of Example I show that this invention permits treating a base oil of standard dispersancy (BSI of 2.5 and BS II of 2.9) to lower the BSI to 1.2 and the BS II to 0.8. In comparison, a control additive, present in amount 2.5 times that of the experimental only lowers the significant BS II to 2.1.

Similarly, the viscosity index of the base oil is increased from 97 to 132 e.g. a desirable increase of 35 units.

Results comparable to those achieved by the use of the amide of the nitroketonized ethylene-propylene-hexadiene (NKEPH) of Example I — with respect to improved dispersancy may also be attained by the following polymers, which may be prepared in manner similar to the technique of Example I:

EXAMPLE VI

EPT containing 65.2 mole % derived from ethylene, 32 mole % derived from propylene, and 2.8 mole % derived from 1,4-hexadiene, of molecular weight $\overline{M}_n$ of about 4800 and containing, per 1380 molecular weight units, one pendant group having the formula

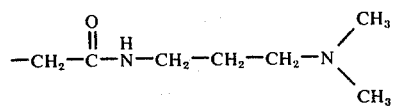

EXAMPLE VII

EPT containing 65.2 mole % derived from the ethylene, 32 mole % derived from propylene, and 2.8 mole % derived from 1,4-hexadiene, of molecular weight $\overline{M}_n$ of about 4800 and containing, per 1380 molecular weight units, one pendant group having the formula

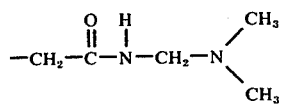

EXAMPLE VIII

EPT containing 57 mole % derived from ethylene 41 mole % derived from propylene, and 2 mole % derived from 1,4-hexadiene, of molecular weight $\overline{M}_n$ of about 4800 and containing per 1800 molecular weight units, one pendant group having the formula:

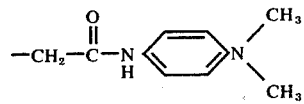

EXAMPLE IX

EPT containing 57 mole % derived from ethylene, 41 mole % derived from propylene, and 2 mole % derived from 1,4-hexadiene, of molecular weight $\overline{M}_n$ of about 4800 and containing per 1800 molecular weight units, one pendant group having the formula:

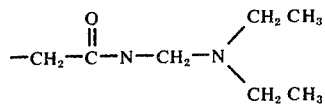

EXAMPLE X

EPT containing 59.3 mole % derived from ethylene, 38.5 mole % derived from propylene, and 2.2 mole % derived from 1,4-hexadiene, of molecular weight $\overline{M}_n$ of about 6700 and containing per 1700 molecular weight units, one pendant group having the formula:

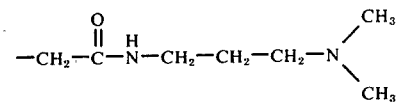

EXAMPLE XI

EPT containing 60.9 mole % derived from ethylene, 38 mole % derived from propylene, and 1.1 mole % derived from 1,4-hexadiene, of molecular weight $\overline{M}_n$ of about 31,000 and containing per 3200 molecular weight units, one pendant group having the formula:

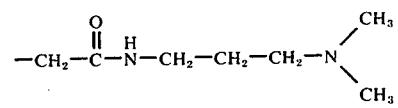

Although this invention has been illustrated by reference to specific embodiments, it will be apparent to those skilled in the art that various changes and modifications may be made which clearly fall within the scope of this invention.

We claim:

1. The method of preparing an amide polymer

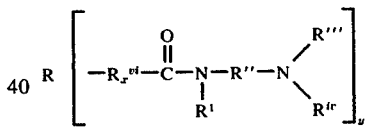

which comprises reacting an alpha-nitroketone

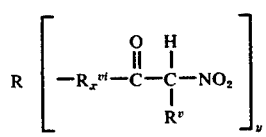

with an amine

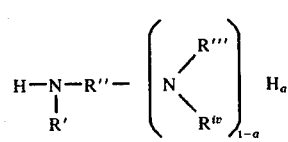

wherein R is a carbon containing polymer residue, R', R''', and $R^{iv}$ are hydrogen or saturated hydrocarbon, $R^v$ is saturated hydrocarbon, R'' and $R^{vi}$ are divalent saturated hydrocarbon, y is 1 – 100, a is 0 or 1, and x is 1 thereby forming product amide polymer.

2. The method of preparing an amide polymer as claimed in claim 1 wherein said amine is a diamine containing (i) a tertiary amine group and a primary amine group or (ii) two primary amine groups.

3. The method of preparing an amide polymer as claimed in claim 1 wherein said amine is dimethylaminopropyl amine.

4. A polymer comprising a backbone chain including carbon atoms and, pendant on at least some but less than all of said carbon atoms, an N-hydrocarbylcarboxamide group spaced from said backbone chain by a divalent saturated hydrocarbon said polymer being the product of the process of claim 1.

5. A polymer as claimed in claim 4 wherein said N-hydrocarbylcarboxamide group is a N-(N'N'-dihydrocarbylaminohydrocarbyl) carboxamide group.

6. A polymer as claimed in claim 4 wherein said N-hydrocarbylcarboxamide group is a N-(N',N'-dialkylaminoalkyl) carboxamide group.

7. A polymer as claimed in claim 4 having a number average molecular weight $\overline{M}_n$ of 300–100,000.

8. A polymer as claimed in claim 4 having a number average molecular weight $\overline{M}_n$ of 300–20,000.

9. A polymer of number average molecular weight $M_n$ of 300–100,000 having the formula

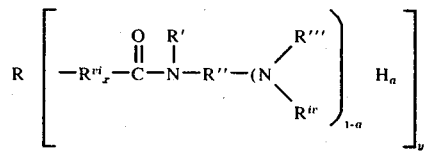

wherein R is a carbon-containing polymer residue, R', R''', and R$^{iv}$ are saturated hydrocarbon, R'' and R$^{vi}$ are divalent saturated hydrocarbon, $x$ is 1, $a$ is 0 or 1 and $y$ is 1–100.

10. A polymer as claimed in claim 9 wherein R is derived from lower olefins.

11. A polymer as claimed in claim 9 wherein R is derived from ethylene.

12. A polymer as claimed in claim 9 wherein R is derived from an ethylene-propylene polymer.

13. A polymer as claimed in claim 9 wherein R is derived from an EPT terpolymer of ethylene, propylene, and ethylidene norbornene or 1,4-hexadiene.

14. A polymer of number average molecular weight $\overline{M}_n$ of 300–100,000 having as repeating groups in the molecule

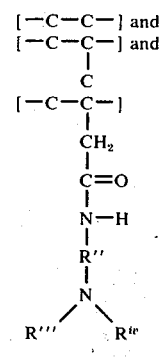

wherein R'' is divalent saturated hydrocarbon and R''' and R$^{iv}$ are hydrogen or saturated hydrocarbon.

* * * * *

UNITED STATES PATENT AND TRADEMARK OFFICE
CERTIFICATE OF CORRECTION

PATENT NO. : 4,007,161

DATED : February 8, 1977

INVENTOR(S) : C. Holder, R. Love and D. Lachowicz

It is certified that error appears in the above-identified patent and that said Letters Patent are hereby corrected as shown below:

Claim 1, line 2, correct the formula to read as follows:

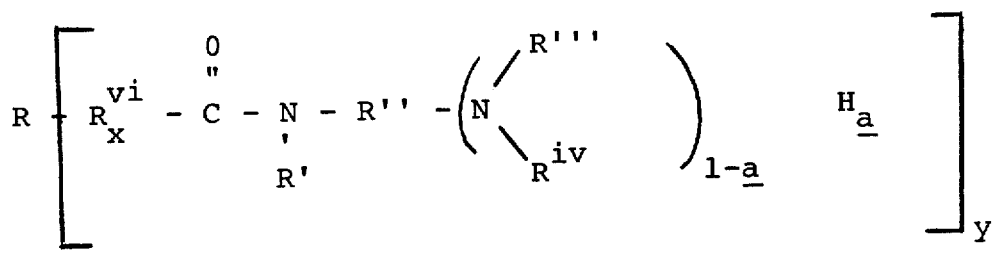

col. 13, line 42, correct the spelling of "ethylene-propylene".

Signed and Sealed this

Sixth Day of June 1978

[SEAL]

Attest:

RUTH C. MASON
*Attesting Officer*

DONALD W. BANNER
*Commissioner of Patents and Trademarks*